(12) United States Patent
Honermann

(10) Patent No.: US 7,350,537 B2
(45) Date of Patent: Apr. 1, 2008

(54) VALVE MOUNTING BRACKET

(75) Inventor: John P. Honermann, Benson, MN (US)

(73) Assignee: CNH America LLC, Racine, WI (US)

( * ) Notice: Subject to any disclaimer, the term of this patent is extended or adjusted under 35 U.S.C. 154(b) by 318 days.

(21) Appl. No.: 10/998,430

(22) Filed: Nov. 29, 2004

(65) Prior Publication Data

US 2006/0113431 A1   Jun. 1, 2006

(51) Int. Cl.
   *F16L 3/00* (2006.01)
(52) U.S. Cl. ................. 137/343; 248/309.1; 248/316.7
(58) Field of Classification Search ................. 239/600, 239/288, 288.3; 251/8, 4, 291; 137/507, 137/360, 356, 343, 899; 134/186; 248/65, 248/309.1, 310; 211/70.6, 72, 73, 70.1; 138/106
   See application file for complete search history.

(56) References Cited

U.S. PATENT DOCUMENTS

| | | | |
|---|---|---|---|
| 2,916,159 A * | 12/1959 | O'Neill | 211/89.01 |
| 2,968,850 A | 1/1961 | Tinnerman | 24/81 |
| 3,029,057 A * | 4/1962 | Ferm | 248/316.7 |
| 3,089,211 A | 5/1963 | Perusse | 24/259 |
| 3,202,291 A | 8/1965 | Root | 211/49 |
| 3,232,568 A | 2/1966 | Lennon et al. | 248/67 |
| 3,302,912 A | 2/1967 | Hurlburt, Jr. | 248/65 |
| 3,595,402 A * | 7/1971 | Smaczny | 211/26 |
| 3,794,067 A | 2/1974 | Beck | 137/343 |
| 3,971,540 A | 7/1976 | Johnson et al. | 251/143 |
| 4,428,512 A | 1/1984 | Nosek | 222/404.15 |
| 5,381,243 A | 1/1995 | Imamura | 358/471 |
| 6,082,702 A * | 7/2000 | Campau | 251/8 |
| 6,874,756 B2 * | 4/2005 | Hawkins et al. | 251/291 |
| 2003/0030021 A1 | 2/2003 | Hawkins et al. | 251/291 |
| 2003/0066981 A1 | 4/2003 | Cross et al. | 251/292 |

FOREIGN PATENT DOCUMENTS

FR    2536625 A1 *  11/1982

* cited by examiner

*Primary Examiner*—Gwendolyn Baxter
(74) *Attorney, Agent, or Firm*—Rebecca Henkel

(57) ABSTRACT

A valve mounting bracket that has generally opposing first and second clamping components to hold a valve body in position relative to the bracket. The first clamping component is positioned to engage the valve body and bias the valve body into rigid contact with the second clamping component.

4 Claims, 3 Drawing Sheets

VALVE MOUNTING BRACKET

BACKGROUND OF THE INVENTION

The present invention relates generally to a retaining or mounting bracket for an agricultural sprayer, and more particularly to a mounting bracket for mounting valves.

For convenience and cost considerations, most valve bodies are made with a generally cylindrical external configuration through which the stem of the valve projects. It is common practice to provide the valve body with an external threaded section upon which is carried a panel mounting nut. Thus, the threaded section can be inserted into an aperture of the appropriate size provided through the panel or mounting bracket, the nut tightened against the wall of the bracket, and clamp the wall between the nut and the valve body to secure the valve in position.

The common mounting practice discussed above, and other similar practices, is time consuming in the original assembly process and when the valve must be removed for servicing, Furthermore, it often happens that the nut is not tightened sufficiently, or becomes loose in operation, against the bracket and the valve may move or otherwise dislocate. This dislocation can result in leaks or rupture in the connection points between the tubes and the valve. Additionally, in some situations the valve may have to be disassembled, and if this happens, reassembly my not be done properly, in which case the valve may not operate as intended, or at all.

It would be a significant advantage to provide a mounting bracket for a valve that eliminates the above-described problems.

SUMMARY OF THE INVENTION

Accordingly, it is an object of the present invention is to provide a valve mounting bracket.

Another object of the present invention is to provide a valve mounting bracket that can secure a valve in a fixed position relative to the bracket.

It is another object of the present invention to provide a valve mounting bracket that will securely hold a valve in position despite the application of external forces from any direction.

Yet another object of the present invention is to provide a valve mounting bracket wherein the valve may be easily affixed to the valve body and readily removed therefrom without disassembly of the valve body.

It is yet another object of the present invention to provide a valve mounting bracket that is durable in construction, inexpensive of manufacture, carefree of maintenance, facile in assemblage, and simple and effective in use.

It is a further object of the present invention to provide a valve mounting bracket that does not require the removal of tie rods holding the valve together, and thus does not require more delicate torque setting procedures to remount the valve.

These and other objects are attained by providing a valve mounting bracket that has generally opposing first and second clamping components to hold a valve body in position relative to the bracket. The first clamping component is positioned to engage the valve body and bias the valve body into rigid contact with the second clamping component.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
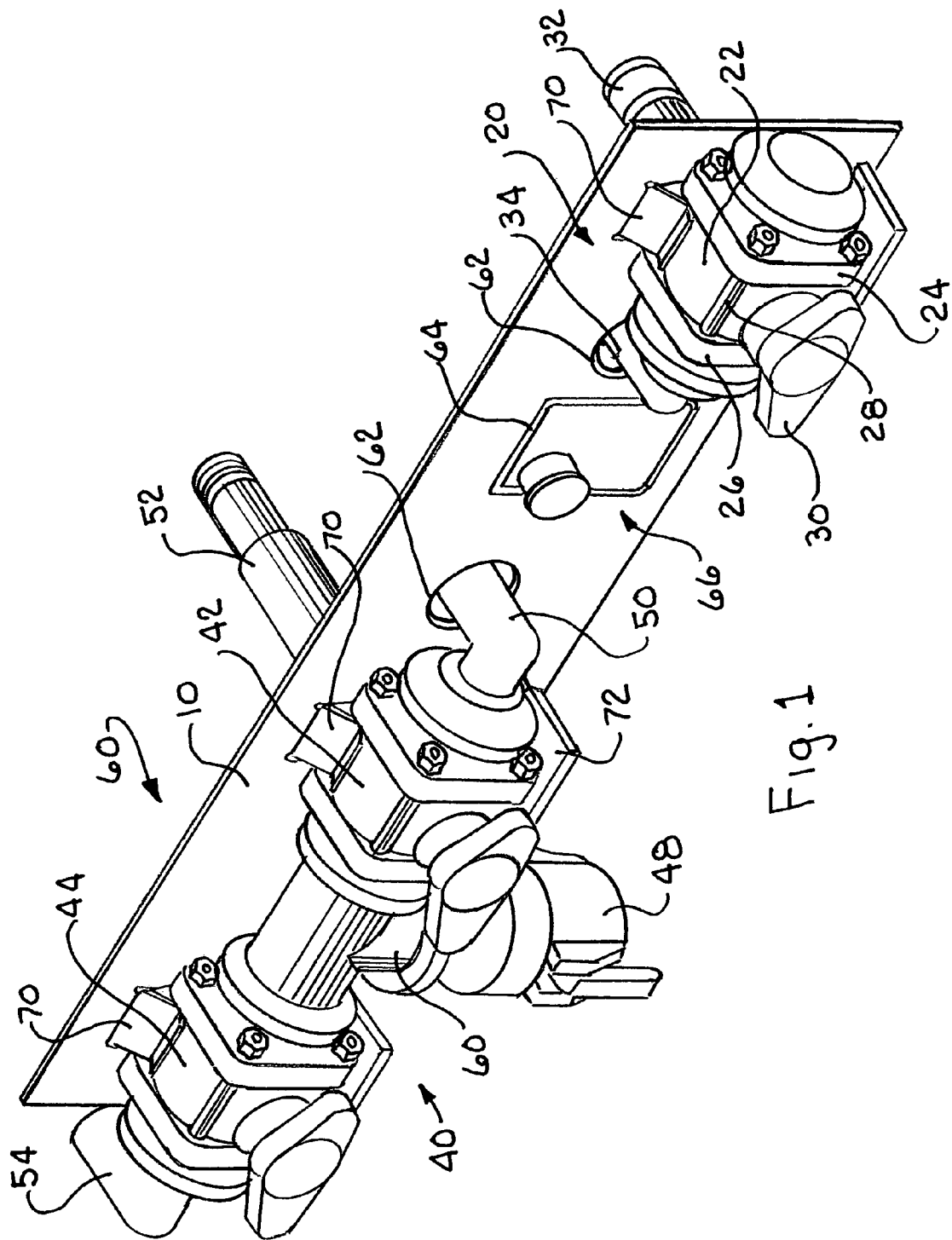
FIG. 1 is a front perspective view of a series of valves affixed to the mounting bracket of the present invention.

The mounting bracket 10 of the instant invention is intended for use with a valve 20 having a cylindrical body 22 with a longitudinal axis and containing the valve stem, seat and other components (not shown) that are held in position by transverse generally rectangular flanges 24, 26. The four corners of each flange 24, 26 is drilled to receive an elongate bolts 28 that serve as tie rods maintaining the valve as a unit. A valve control handle 30 is affixed to the outer end of the valve stem and permits liquid flow through the valve to be manually controlled.

Valve 20 interconnects an inlet connector 32 and an outlet connector 34 and manages the liquid flow to whatever system components are located downstream thereof. In this regard, the instant invention was developed for use with an agricultural crop spraying system, but would find application in substantially any system in which the valves must periodically be removed for service, or to significantly reduce the assembly time of any type of liquid-handling system.

A plurality of valves such as valve 20 may be joined into a bank of two or more, depending upon system requirements. For instance the bank of valves shown generally as 40 in FIG. 1 includes two valves 42, 44 joined by T-connector 46 interconnecting input connector 48 to outlet connectors 50, 52 and 54.

Figure 2:
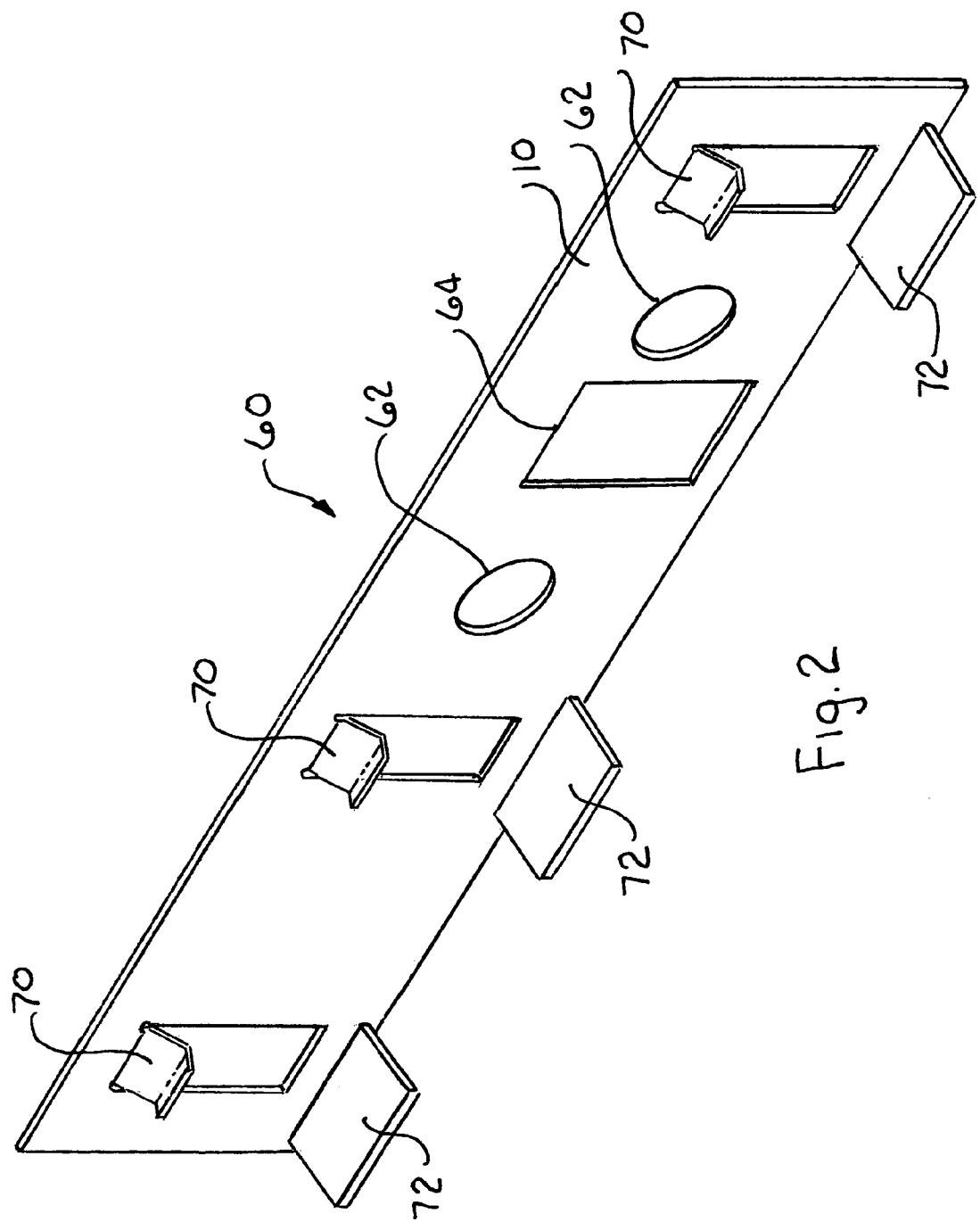
FIG. 2 is perspective view of the mounting bracket.

FIG. 2 shows the mounting bracket 10 to comprise a rectangular plate 60 with various openings formed therein of various shapes as required by the valves and other system elements. Round openings, such as at 62 accommodate the cylindrical shape of connectors while a rectangular opening may be appropriate for a small control panel, such as 66. In each position where a valve is to be located, a rectangular retaining tab 70 is formed, as by through-cutting three adjacent sides of the rectangle and bending the retaining tab slightly forwardly (as determined by the intended location of the valve(s) relative to plate 60). Using a relatively light metal with reasonable resiliency, retaining tab 70 will function somewhat like a spring or biasing means, as will be discussed further below. Alternatively, plate 60 can be formed from a plastic material with characteristics very similar to the metal identified above.

Figure 3:
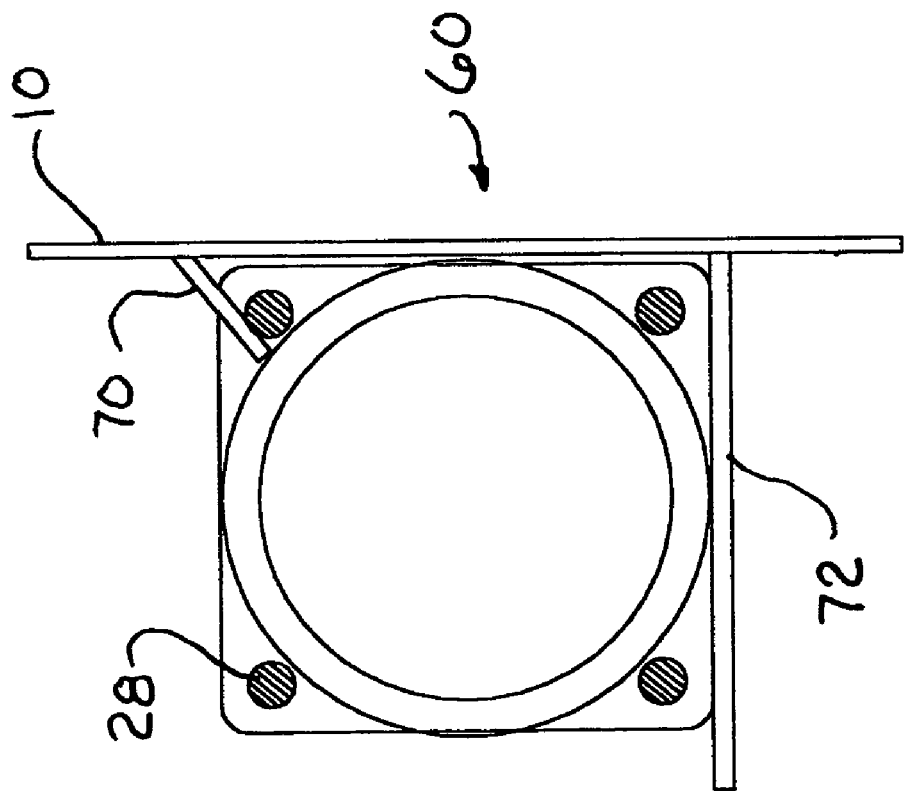
FIG. 3 is a sectional view of the valve clamping components of the mounting bracket, taken along lines 3-3 of FIG. 1.

FIGS. 2 and 3 also show a mounting shelf 72 rigidly affixed to plate 60 and extending generally perpendicularly and forwardly therefrom, below the cutout for retaining tab 70. In operation of this preferred embodiment, bracket 10 is rigidly affixed to a structural member of the machine, the valves assembled as required, upper rear tie rod is placed under retaining tab 70, and then the valve is rotated downwardly and rearwardly onto mounting shelf 72. Retaining tab 70 flexes upwardly slightly until it snaps over the tie rod. The downward bias of the retaining tab holds the valve against mounting shelf 72. To remove the valve, the steps are reversed.

Figure 4:
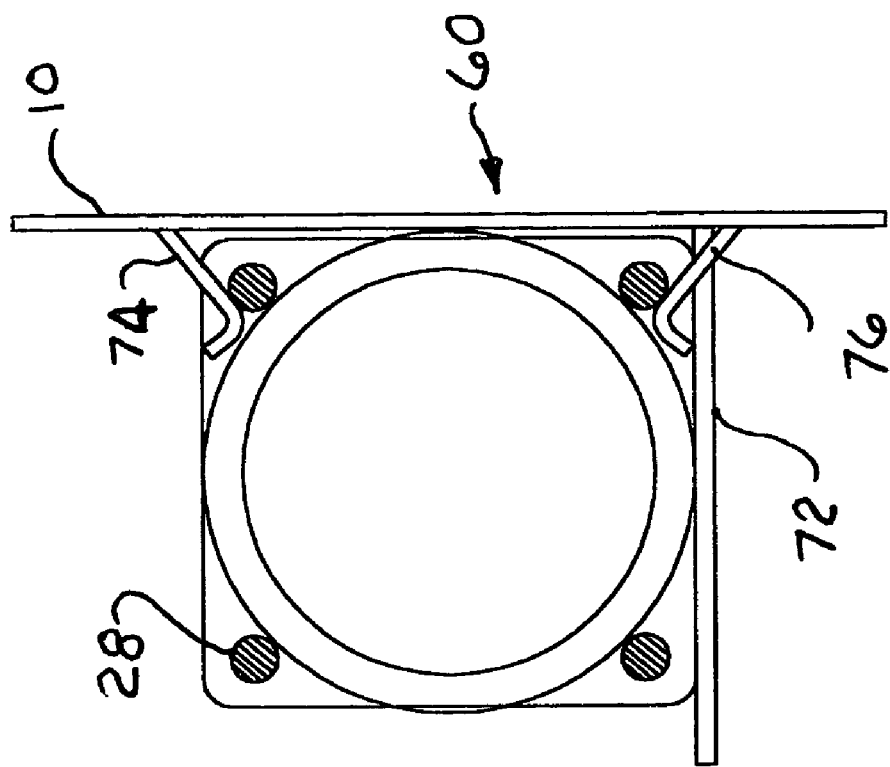
FIG. 4 is a sectional view, similar to FIG. 3, of alternative valve clamping components.

An alternative embodiment is shown in cross-section in FIG. 4 to dispense with the mounting shelf. Instead, two opposing tabs are formed in plate 60, one above the other. Tab 74 snaps over the upper rear tie rod and tab 76 snaps over the lower rear tie rod. To affix the valve to the mount, the lower rear tie rod is placed behind tab 76 and the valve is rotated rearwardly until tab 74 snaps over the upper rear tie rod. The process is reversed to remove the valve. This attachment can be used with or without mounting shelf 72.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. An hydraulic valve and mounting bracket comprising:
an hydraulic valve:
having inlet and outlet connectors and a generally cylindrical body portion with a longitudinal axis;
said cylindrical body containing valve components, said valve components held in position by a first and second spaced-apart generally aligned rectangular flanges transverse to said longitudinal axis;
said flanges tightly interconnected by four tie rods extending through respective corners of said first and second flanges and parallel to said and adjacent said cylindrical body portion;
a mounting bracket comprising:
a generally rectangular plate having a forward and an opposing rearward surfaces and top and bottom opposing edges, said plate adapted to be affixed to and support by a rigid support;
said rectangular plate having openings therethrough to receive inlet and outlet connectors on said valve;
a retaining tab formed in said rectangular plate and extending slightly forwardly from said plate and opening toward said bottom edge; and
a mounting shelf affixed to said plate and extending forwardly therefrom, said mounting shelf positioned toward said bottom edge of said plate relative to said retaining tab, whereby one of said tie rods is located under said retaining tab and said valve sits on said mounting shelf with said inlet and outlet connectors extend into said openings.

2. The mounting bracket of claim 1, wherein:
said retaining tab is generally rectangular in shaped, with three adjacent free edges and one edge integral with said plate.

3. The mounting bracket of claim 2, wherein:
said plate is comprised of a rigid metallic material with sufficient memory to allow said retaining tab to flex and return to its original condition.

4. The mounting bracket of claim 2, wherein:
said plate is comprised of a plastic material with sufficient memory to allow said retaining tab to flex and return to its original condition.

\* \* \* \* \*